United States Patent [19]

Ohba et al.

[11] Patent Number: 4,986,866
[45] Date of Patent: Jan. 22, 1991

[54] PROCESS FOR PRODUCING SYNTHETIC LABEL PAPER

[75] Inventors: Yozo Ohba; Masaaki Yamanaka; Moriyasu Sudo; Akira Iwai, all of Ibaraki, Japan

[73] Assignee: Oji Yuka Goseishi Co., Ltd., Tokyo, Japan

[21] Appl. No.: 451,007

[22] Filed: Dec. 15, 1989

[51] Int. Cl.⁵ .............................................. B32B 31/20
[52] U.S. Cl. ..................... 156/220; 156/229; 264/291; 264/293; 428/172; 428/910
[58] Field of Search ................. 156/209, 220, 229; 264/291, 293; 428/172, 910

[56] References Cited

U.S. PATENT DOCUMENTS 3,765,999 10/1973 Toyoda ........................ 156/229 X
3,783,088 1/1974 Yoshiyasu et al. ............ 264/291 X
3,993,718 11/1976 Bontinck et al. ............... 264/171 X Primary Examiner—Robert A. Dawson
Attorney, Agent, or Firm—Oblon, Spivak, McClelland, Maier & Neustadt

[57] ABSTRACT

A process for producing synthetic label paper which comprises preparing a multi-layer film comprising a film of a thermoplastic resin containing an inorganic fine powder having provided on the back side thereof a layer of a heat-sealable resin having a melting point lower than that of said thermoplastic resin, embossing the heat-sealable resin layer, and stretching the embossed multi-layer film at a temperature of from the melting point of said heat-sealable resin to a temperature lower than the melting point of said thermoplastic resin. The label paper, when used for in-mold decorating of a container, gives a blister-free appearance to a container, causes no deformation of a container, and exhibits sufficient nerve for fitting to an inner wall of a mold.

5 Claims, 3 Drawing Sheets

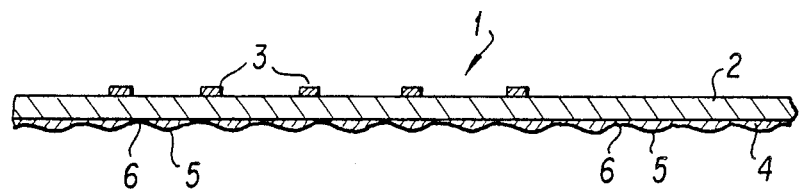
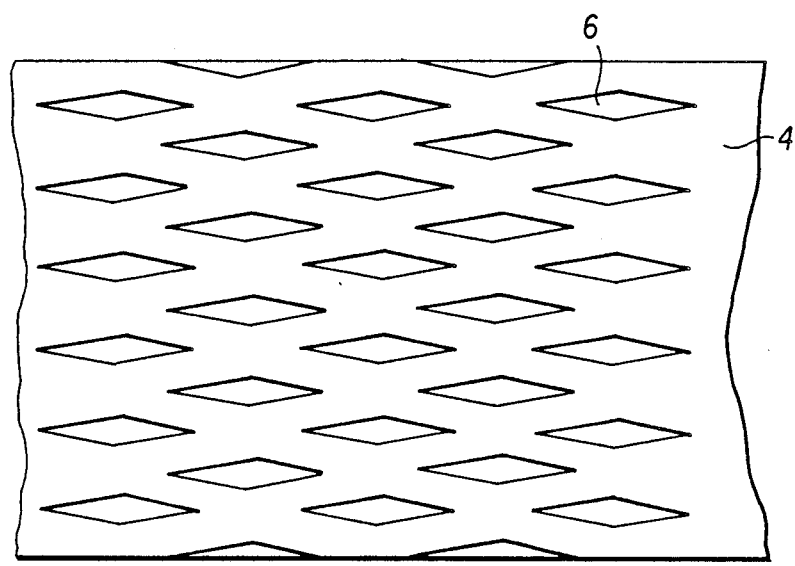

PROCESS FOR PRODUCING SYNTHETIC LABEL PAPER

FIELD OF THE INVENTION

This invention relates to a process for producing synthetic paper as a label, inclusive of a blank, for synthetic resin containers obtained by differential pressure forming or blow molding. More particularly, it relates to a process for producing synthetic label paper for decorating a synthetic resin container, which is fixed in-mold and integrally molded with a thermoplastic resin by blow molding, vacuum forming, or pressure forming to provide a labeled resin container.

BACKGROUND OF THE INVENTION

Integral forming or molding for producing resin containers with a label has conventionally been carried out by inserting a label or a blank in a mold beforehand and then molding or forming a container by injection molding, blow molding, differential pressure forming, foam molding, etc. Labels to be used include gravure printed resin films, multi-color offset printed synthetic paper [cf. JP-B-46-40794, JP-B-54-31030 (the term "JP-B" as used herein means an "examined published Japanese patent application"), and British Patent No. 1090059], and gravure printed aluminum foil having a polyethylene layer on the back side thereof.

When a label-decorated resin container is produced by fusing a label, inclusive of a blank, with a molten resin at a high pressure as in injection molding (e.g., 100 to 1000 kg/cm$^2$), the resulting molded article has a satisfactory appearance. However, in the case of molding at a low pressure as in differential pressure forming (e.g., 2 to 7 kg/cm$^2$) or blow molding (e.g., 1 to 10 kg/cm$^2$), escaping of air between a blank and a molten container is insufficient only to provide containers having poor appearance due to trapped air-pockets called blisters.

To settle the above-described problem, the applicant previously proposed to use a label, inclusive of a blank, having an embossed finish on the back surface thereof so that the air between the label and a container may easily escape to thereby prevent blistering as disclosed in Japanese Utility Model Application No. 63-1775 (corresponding to unexamined published Japanese Utility Model Application No. 1-105960). This label for resin formed containers comprises a printed thermoplastic resin film having provided on its back side a heat-sealable resin layer having a melting point lower than that of the thermoplastic resin film, the heat-sealable resin layer having an embossed pattern of 5 to 25 lines per inch.

On the other hand, it has also been proposed to orient a multi-layer film by stretching to provide a thinskinned label having nerve as described in the working examples of the above cited application.

Where synthetic paper is embossed after orientation, an emboss is easily formed to a large depth (h) and, as a result, the nerve having been increased by orientation is more or less reduced. Unless the label has nerve to some extent, errors occur in fixing a label to the inner wall of a mold by means of a sucking pad of an automatic label feeder.

SUMMARY OF THE INVENTION

An object of this invention is to provide a process for producing embossed synthetic label paper which causes no blister on integral molding with a molten resin while retaining sufficient nerve even after embossing.

As a result of extensive investigations, the inventors have found that the above object of this invention is accomplished by embossing a heat-sealable resin layer of a multi-layer film prior to orientation.

The present invention relates to a process for producing synthetic label paper which comprises preparing a multi-layer film comprising a film of a thermoplastic resin containing an inorganic fine powder having provided on the back side thereof a layer of a heat-sealable resin having a melting point lower than that of said thermoplastic resin, embossing the heat-sealable resin layer, and stretching the multi-layer film at a temperature of from the melting point of said heat-sealable resin to a temperature lower than the melting point of said thermoplastic resin.

BRIEF DESCRIPTION OF THE DRAWINGS

FIGS. 1 and 5 each shows a crossectional view of the label according to the present invention.

FIG. 2 is a plane view of the back side of the label according to the present invention.

DETAILED DESCRIPTION OF THE INVENTION

The label for in-mold decorating according to the present invention is described below by referring to a blank suitable for use in production of labeled containers by blow molding for instance.

FIG. 1 shows a cross section of a label for in-mold blow molding according to the present invention. In FIG. 1, numerals have the following meanings. 1 . . . label, 2 . . . thermoplastic resin film base layer, 3 . . . printing, 4 . . . heat-sealable resin layer, 5 . . . tops of dot-embossed pattern on the heat-sealable resin layer, and 6 . . . valleys of the dot-embossed pattern.

Figure 3:
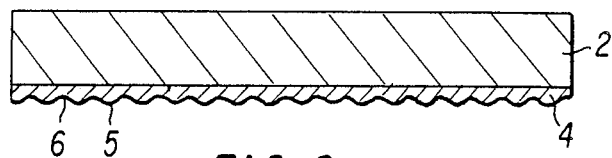
FIG. 3 is a crossectional view of an embossed multi-layer film before stretching.
Figure 4:
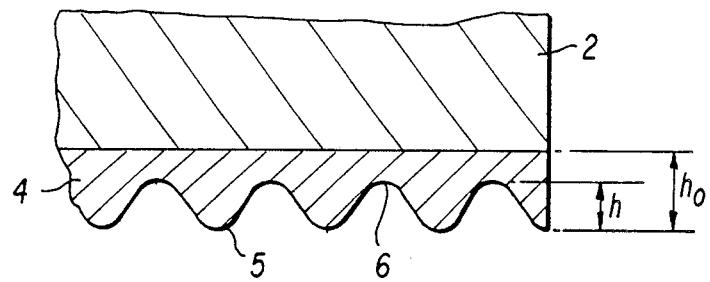
FIG. 4 is an enlarged view of a part of the embossed multi-layer film of FIG. 3.

FIG. 2 shows a plane view of heat-sealable resin layer 4 of label 1 (back side of the label). FIG. 3 is a cross sectional view of a multi-layer film before stretching and printing for obtaining the label of FIG. 1. FIG. 4 is an enlarged view of a part of the multi-layer film shown in FIG. 3.

In FIGS. 3 and 4, the embossed pattern made on the multi-layer film has 5 to 200, preferably 15 to 120, dots or lines per inch (2.54 cm). The number of dots or lines per inch is called "number of lines" and is a measure of fineness of an embossed pattern.

The depth of the embossed pattern (h) is at least $\frac{1}{3}$, preferably at least $\frac{1}{2}$, of the thickness of heat-sealable resin layer 4 ($h_0$). The valleys of the embossed pattern may cut into base layer 2 ($h > h_0$).

When the embossed multi-layer film of FIG. 3 is stretched at least uniaxially at a stretch ratio of from 4 to 12, the thickness of the multi-layer film decreases, and the embossed pattern is enlarged while the valleys are made shallow. The heat-sealable resin layer preferably has a Bekk's surface smoothness of not more than 1000 seconds as measured according to JIS P-8119 and an average surface roughness (Ra) of from 0.5 to 5 μm.

Base layer 2 is a resin film comprising a thermoplastic resin having a melting point ranging from 135 to 264° C., e.g., polypropylene, high-density polyethylene, polyvinyl chloride, polyethylene terephthalate, and polyamide, containing from 8 to 65% by weight of an inorganic fine powder, based on the total amount of the thermoplastic resin and the inorganic fine powder. The above-described resin film having coated thereon an inorganic filler-containing latex or having thereon an aluminum deposit may also be used as base layer 2.

Inorganic fine powders which can be used in the present invention include talc, diatomaceous earth, calcium carbonate, calcined clay, titanium oxide, barium sulfate, and mica. The inorganic fine powders have a particle size of not greater than 15 μm, preferably between 0.05 μm and 5 μm.

On the back side of base layer 2 (i.e., the side to be contacted with a resin container) is provided heat-sealable resin layer 4 comprising a heat-sealable resin having a melting point of from 80° to 135° C., e.g., low-density polyethylene, a vinyl acetate-ethylene copolymer, an ethylene-acrylic acid copolymer, an ethylene-methacrylic acid copolymer or a metal salt thereof, and a styrene-ethylene copolymer. Heat-sealable resin layer 4 is embossed using a metallic roll and a rubber roll. The heat-sealable resin layer serves to firmly adhere the label to a resin container.

Stretching of the embossed multi-layer film is carried out at a temperature of from the melting point of the heat-sealable resin to a temperature lower than the melting point of the resin constituting the base layer. By stretching, the base layer is oriented while the heat-sealable layer remains non-oriented.

Base layer 2 may have a single layer structure or a multi-layer structure composed of two or more layers.

In particular, where polypropylene is used as a base layer of a label, and high-density polyethylene or linear polyethylene is used as a resin to be blow molded, it is preferable to use synthetic label paper having a multi-layer structure comprising at least the following four layers (A) to (D) and having a total thickness of from 30 to 300 μm:

(A) a biaxially stretched film base layer comprising a resin composition containing from 5 to 30% by weight of an inorganic fine powder, from 0 to 25% by weight of an ethylene resin and from 70 to 95% by weight of a propylene resin, with the total amount of the inorganic fine powder, the ethylene resin and the propylene resin being 100% by weight, (B) a uniaxially stretched paper-like film layer comprising a resin composition containing from 35 to 65% by weight of an inorganic fine powder and from 35 to 65% by weight of a propylene resin, with the total amount of the inorganic fine powder and the propylene resin being 100% by weight, being provided on one side of said biaxially stretched film base layer (A), (C) a uniaxially stretched paper-like film layer comprising a resin composition containing from 35 to 65% by weight of an inorganic fine powder and from 35 to 65% by weight of a propylene resin, with the total amount of the inorganic fine powder and the propylene resin being 100% by weight, being provided on the opposite side of said biaxially stretched film base layer (A), and (D) a uniaxially stretched heat-sealable layer (non-oriented) having a thickness of from 1 to 10 μm and comprising an ethylene-alkyl acrylate copolymer, an ethylene-alkyl methacrylate copolymer, or a resin composition comprising (a) from 10 to 70% by weight of a styrene-modified ethylene resin obtained by polymerizing from 5 to 400 parts by weight of styrene in the presence of 100 parts by weight of an ethylene resin and (b) from 30 to 90% by weight of an ethylene-alkyl acrylate copolymer or an ethylene-alkyl methacrylate copolymer each having a melting point of from 80° to 130° C., with the total amount of the resin as defined in (a) and the copolymer as defined in (b) being 100% by weight, being provided on the surface of said paper-like layer (C).

Figure 5:
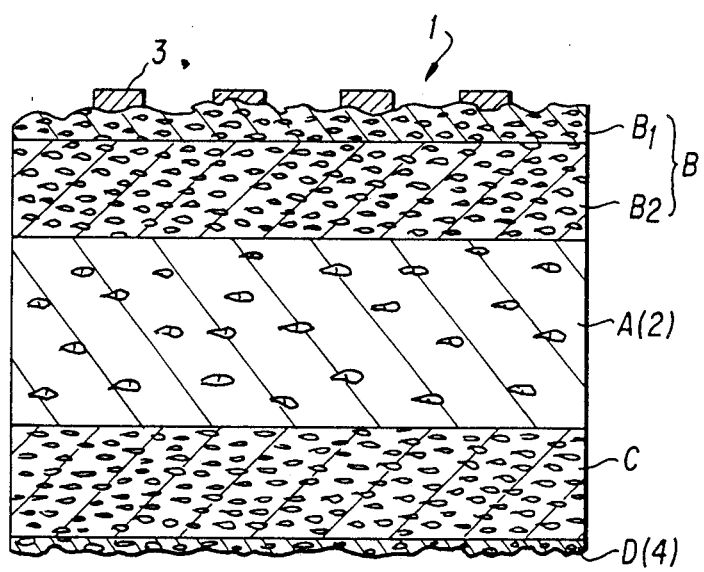

FIG. 5 shows a cross sectional view of the label according to this preferred embodiment. In FIG. 5, (A) (2) is a base layer comprising a biaxially stretched film; (B) and (C) are paper-like layers comprising a uniaxially stretched film; and (D) (4) is a heat-sealable layer. A multi-layer film includes all these film layers. The numeral 3 is a printing formed on paper-like layer (B).

Each of layers (A), (B), and (C) may have a single layer structure or a multi-layer structure. In the example shown in FIG. 5, layer (B) is composed of two paper-like layers ($B_1$) and ($B_2$) differing in composition.

The multi-layer film according to this embodiment is produced by longitudinally stretching a film of the resin composition constituting layer (A) at a temperature lower than the melting point of the propylene resin constituting layer (A), e.g., 134° to 155° C., at a stretch ratio of from 3.5 to 7 by making use of a difference in peripheral speed between rolls, laminating a molten film comprising the resin composition constituting layer (B) on one side of the resulting stretched film, laminating a resin composition constituting layer (C) and a resin composition constituting layer (D) on another side of said stretched film in such a manner that layer (D) be the outermost layer by feeding these resin compositions from the respective extruders to the same die, laminating them in the die, followed by co-extrusion, embossing layer (D), and finally transversely stretching the laminated film at a temperature at which layer (D) is melted but paper-like layer (B) and base layer (A) are not melted (i.e., a temperature lower than the melting point of the propylene resin).

By the stretching, a number of microvoids are formed in layers (A), (B), and (C) making use of the inorganic powders as nuclei to thereby decrease the density and basis weight of the multi-layer film. On the other hand, the stretching causes cracks on the surface of layer (B) making use of the inorganic powders as nuclei to thereby improve ink receptivity and drying properties of the label. If paper-like layer (B) is a biaxially stretched film, not only is increased the opportunity for the inorganic fine powder to fall off the layer but also cases may be met with, in which the deep cracks formed by uniaxial stretching disappear through the further stretching thereby deteriorating offset printing suitability as compared with a uniaxially stretched film.

The multi-layer stretched film of the preferred embodiment may also be prepared by laminating a molten film each of the resin compositions for layers (B) and (C) on each side of the longitudinally stretched film as layer (A), laminating a molten film for heat-sealable resin layer (D) on layer (C), and transversely stretching the resulting laminated film at a temperature of from the melting point of the high-density polyethylene to a temperature lower than the melting point of the propylene resin.

Included in the propylene resin which can be used in the above-described preferred embodiment are those having a degree of crystallinity of 40% or higher, preferably 70% or higher, such as a propylene homopolymer and a random or block copolymer of propylene as a main unit and one or more comonomer units selected from α-olefins, e.g., ethylene, butene-1, hexene-1, pentene-1, and 4-methylpentene-1.

A part of, usually not more than 10% by weight of, the propylene polymer may be replaced with an ethylene resin, e.g., high-density polyethylene, low-density polyethylene, linear polyethylene, an ethylene-vinyl acetate copolymer, an ethylene-acrylic acid copolymer, an ethylene-alkyl acrylate copolymer or an ethylene-alkyl methacrylate copolymer (the alkyl moiety contains from 1 to 8 carbon atoms), and a metal salt (e.g., a salt with zinc, aluminum, lithium, potassium, or sodium) of an ethylene-methacrylic acid copolymer; or polystyrene. These ethylene resins whose melting point is lower than that of the propylene resin are useful as the heat-sealable resin per se for layer (D) or the ethylene resin component of the styrene-modified ethylene resin, one of the components constituting the resin composition for layer (D). They are also useful, when added to the base layer or paper-like layers comprising the propylene resin, to facilitate stretching of these layers and to enhance the laminate bond strength between layers.

The content of the inorganic fine powder is made higher in paper-like layers (B) and (C) then in base layer (A). Since the base layer is biaxially stretched, the size of formed microvoids is greater than those of the uniaxially stretched paper-like layers. The base layer has an effect to make a balance of strength between longitudinal and transverse directions thereby preventing tearing of the label. Since excess microvoids lead to reduction of strength of the base layer, the content of the inorganic fine powder in the base layer is 30% by weight at the highest.

Paper-like layers (B) and (C) contains a large quantity of the inorganic fine powder for the purpose of improving printability and writability of the label. The inorganic fine powder content in these layers ranges from 35 to 65% by weight, preferably from 35 to 52% by weight, based on the total amount of the inorganic fine powder and the propylene resin in the resin composition for layer (B) or (C).

Heat-sealable layer (D) (4) is a non-oriented uniaxially stretched film comprising (i) an ethylene-alkyl acrylate copolymer, (ii) an ethylene-alkyl methacrylate copolymer, or (iii) a resin composition comprising (a) from 10 to 70% by weight of a styrene-modified ethylene resin obtained by polymerizing from 50 to 400 parts by weight of styrene in the presence of 100 parts by weight of an ethylene resin and (b) from 30 to 90% by weight of an ethylene-alkyl acrylate copolymer or an ethylene alkyl methacrylate copolymer each having a melting point of from 80° to 130° C., with the total amount of the resin as defined in (a) and the copolymer as defined in (b) being 100% by weight.

The styrene-modified ethylene resin as the component (a) is obtained by suspending 100 parts by weight of ethylene resin particles in water, dropwise adding 50 to 400 parts by weight of styrene to the suspension in the presence of a polymerization initiator to conduct suspension polymerization. Reference can be made in, e.g., JP-A-56-55433, JP-A-49-5473, and JP-A-50-127965 (the term "JP-A" as used herein means an "unexamined published Japanese patent application").

Ethylene resins to be modified include those having a melting point of from 80° to 135° C., such as low-density polyethylene, high-density polyethylene, middle-density polyethylene, linear polyethylene, an ethylene-vinyl acetate copolymer having a vinyl acetate content of not more than 8% by weight, an ethylene-alkyl acrylate copolymer and an ethylene-alkyl methacrylate copolymer.

Modifying styrene may be used either alone or be partly (usually in a proportion of 50% by weight or less) replaced with acrylic acid, methacrylic acid, itaconic acid, maleic anhydride, a lower alkyl acrylate containing up to 8 carbon atoms in the alkyl moiety thereof, a lower alkyl methacrylate containing up to 8 carbon atoms in the alkyl moiety thereof, etc.

The ethylene-lower alkyl acrylate or methacrylate copolymer as the component (b) has a melting point of from 80° to 130° C. The component (b) may be a copolymer or a terpolymer comprising ethylene and a lower alkyl acrylate or a lower alkyl methacrylate as major units. Terpolymers or higher-order polymers containing not more than 8% by weight, based on the total amount of the copolymer, of other vinyl monomers may also be used as component (b).

Specific examples of suitable component (b) are an ethylene-methyl acrylate copolymer, an ethylene-ethyl acrylate copolymer, an ethylene-propyl acrylate copolymer, an ethylene-t-butyl acrylate copolymer, an ethylene-methyl acrylate-acrylic acid terpolymer, an ethylene-methyl acrylate-methacrylic acid terpolymer, an ethylene-methyl acrylate-itaconic acid terpolymer, an ethylene-methyl acrylate-maleic anhydride terpolymer, an ethylene-methyl acrylate-n-butyl acrylate terpolymer, an ethylene-n-butyl acrylate-methyl methacrylate terpolymer, an ethylene-methyl methacrylate copolymer, an ethylene-ethyl methacrylate copolymer, an ethylene-propyl methacrylate copolymer, an ethylene-butyl methacrylate copolymer, an ethylene-methyl methacrylate-acrylic acid-methacrylic acid quarterpolymer, an ethylene-methyl methacrylate-2-ethylhexyl acrylate terpolymer, and an ethylene-ethyl acrylate-acrylonitrile terpolymer.

Layer (D) may contain an inorganic fine powder.

Use of the above-described heat-sealable layer containing a polar group improves adhesion between the resin formed container and the label.

If desired, for the purpose of improving surface printability or adhesion, the multi-layer film after stretching may be subjected to surface treatments, such as a corona discharge treatment, a flame treatment, and a plasma treatment.

Printing of the label can be carried out by gravure printing, offset printing, flexographic printing, screen printing, etc. Patterns to be printed include bar codes, makers, sellers, characters, trademarks, usages, and the like.

Printed and embossed label 1 is cut into pieces of desired shape and size by punching. The label may be adhered to a part of the outer surface of a container, but usually used as a blank surrounding the side wall of a cup container or a label adhered to the surface of a bottle container produced by blow molding.

In the production of a labeled container by blow molding, when the molded container is cooled to room temperature, the container itself undergoes shrinkage at a percent shrinkage of from about 1 to 2.5% in the direction of extrusion of a parison and from about 1.5 to 2.5% in the direction perpendicular to the extrusion direction. Therefore, it is preferable that the label should be fixed to the mold in such a manner that the direction of the label which undergoes smaller heat shrinkage may be consistent with the direction of extrusion of a parison which has a smaller percent shrinkage to thereby minimize deformation of the molded container. Thus, blow molding using the label according to the present invention can be carried out according to known techniques, except that the in-mold label is preferably placed in such a manner that the direction of smaller heat shrinkage of the label be in the direction of the extrusion of the parison.

Differential pressure forming using the label of the present invention can be carried out by either vacuum forming or pressure forming. Usually, differential pressure forming is performed by a combination of both forming techniques while utilizing a plug assist.

Since a labeled container is obtained by integral forming or molding with an in-mold label as described above, the label undergoes neither deformation nor blistering, exhibits strong adhesion to the container, and gives a satisfactory appearance to the container.

The present invention is now illustrated in greater detail with reference to the following Examples, but it should be understood that the present invention is not construed as being limited thereto. In these examples, all the percents, parts, and ratios are by weight unless otherwise indicated.

EXAMPLE 1

A compound (A) was prepared, which comprised 70% of a propylene homopolymer having a melt flow rate (MFR) of 0.8 and a melting point of 164° C., 12% of high-density polyethylene having a melting point of 134° C., and 18% of calcium carbonate having an average particle size of 1.5 μm, with the total amount of the propylene homopolymer, high-density polyethylene and calcium carbonate being 100%. The compound (A) was kneaded in an extruder set at 270° C., sheet-extruded, and cooled in a cooling device to obtain an unstretched sheet (A). Sheet (A) was heated to 145° C. and longitudinally stretched 5 times.

Separately, a compound (B) comprising 58% of a propylene homopolymer having an MFR of 4.0 and 42% of calcium carbonate having an average particle size of 1.5 μm, with the total amount of the propylene homopolymer and calcium carbonate being 100%, and low-density polyethylene (D) having a melting point of 117° C. were melt-kneaded at 270° C. in separate extruders, fed to the same die and laminated in the die. The (B)/(D) laminate was co-extruded and laminated on the back side of sheet (A) with layer (D) as an external layer. The resulting (A)/(B)/(D) multi-layer sheet was passed through embossing rolls composed of a metallic roll and a rubber roll to add an emboss finish having 80 lines at 0.3 mm intervals and a valley depth of 30 μm to the surface of layer (D).

On the other hand, compound (B) was laminated on the surface side of sheet (A) to produce a (B)/(A)/(B)/(D) multi-layer film.

The multi-layer film was heated to about 155° C. and transversely stretched 9 times. Then, layer (B) was subjected to a corona discharge treatment followed by cooling to 55° C. After trimming, there was obtained synthetic paper comprised of four layers of (B), (A), (B), and (D) in this order having a thickness of 30 μm, 70 μm, 30 μm, and 10 μm, respectively.

Offset printing was conducted on the paper-like layer (B) of the synthetic paper, followed by punching to obtain a 60 mm wide and 110 mm long label for blow molding.

Layer D of the label had a Bekk's surface smoothness of 110 seconds, an average surface roughness (Ra) of 3.2 μm, and a Taber hardness of 1.8 g-cm in the machine direction (MD) and 3.5 g-cm in the transverse direction (TD) as measured according to JIS P-8125.

The label was fixed to the inner wall of one of split-cavity blocks for blow molding by suction, with the printed side (layer B) contacting with the mold. High-density polyethylene (melting point: 134° C.) was melt-extruded at 190° C. to form a tubular parison, and the split blocks were clamped. Compressed air of 4.2 kg/cm² was fed into the parison whereby the parison was expanded to shape of a container and, at the same time, the label was fused to the container. After cooling, the mold was opened to obtain a hollow container.

The label on the hollow container showed no fading of the print, no shrinkage, and no blisters. Further, the feed of the label to the split was consecutively conducted 100 times by the use of an automatic label feeder without any fall off the mold.

COMPARATIVE EXAMPLE 1

A compound (A) comprising 70% of a propylene homopolymer having an MFR of 0.8 and a melting point of 164° C., 12% of high-density polyethylene, and 18% of calcium carbonate having an average particle size of 1.5 μm, with the total amount of the propylene homopolymer, high-density polyethylene and calcium carbonate being 100%, was kneaded in an extruder set at 270° C., sheet-extruded, and cooled in a cooling device to obtain an unstretched sheet. The sheet was heated to 145° C. and longitudinally stretched 5 times to obtain a stretched sheet (A).

Separately, a compound (B) comprising 58% of a propylene homopolymer having an MFR of 4.0 and 42% of calcium carbonate having an average particle size of 1.5 μm, with the total amount of the propylene homopolymer and calcium carbonate being 100%, and low-density polyethylene (D) having a melting point 117° C. were melt-kneaded at 270° C. in separate extruders, fed to the same die, and laminated in the die. The (B)/(D) laminate was co-extruded into a sheet and laminated on the back side of sheet (A) with layer (D) as an external layer. On the other hand, compound (B) was laminated on the surface side of sheet (A). The resulting laminated sheet was again heated to 155° C., transversely stretched 9 times, subjected to a corona discharge treatment, cooled to 55° C., and trimmed to obtain synthetic paper composed of four layers (B), (A), (B), and (D) in this order having a thickness of 30 μm, 70 μm, 30 μm, and 10 μm, respectively.

After offset printing was conducted on the paper-like layer (B) of the synthetic paper, the synthetic paper was passed through embossing rolls to give layer (D) an embossed pattern of 20 lines at 1.27 mm intervals having a valley depth of 8 μm, and then punched to obtain a 60 mm wide and 110 mm long label for blow molding.

The resulting label had a Taber hardness of 1.3 g-cm in MD and 3.1 g-cm in TD.

The label was fixed to the inner wall of one of split-cavity blocks for blow molding by suction, with the printed side (layer B) contacting the mold. High-density polyethylene (melting point: 134° C.) was melt-extruded at 190° C. to form a tubular parison, and the split blocks were clamped. Compressed air of 4.2 kg/cm² was fed into the parison whereby the parison was expanded to shape of a container and, at the same time, the label was fused to the container. After cooling, the mold was opened to obtain a hollow container.

The label on the hollow container showed no fading of the print, no shrinkage, and no blisters. However, when the feed of the label to the split was consecutively conducted by the use of an automatic label feeder, 25 out of 100 labels fell off the mold.

EXAMPLE 2

A compound (A) comprising 40 parts of polypropylene, 25 parts of high-density polyethylene, and 35 parts of calcium carbonate, with the total amount of polypropylene, high-density polyethylene and calcium carbonate being 100%, was melt-kneaded in an extruder at 200° C., and an ethylene-vinyl acetate copolymer (D) having a melting point of 108° C. was melt-kneaded in a different extruder at 180° C. The two molten compounds were fed to the same die and co-extruded followed by cooling to 80° C. to obtain a double-layered film comprising layers (A) and (D) having a thickness of 4000 μm and 100 μm, respectively.

A dot embossed pattern of 100 lines having a valley depth of 50 μm was given to layer D, and the multi-layer film was heated to about 157° C. and stretched 7 times in the longitudinal direction and 6.5 times in the transverse direction. After layer A was subjected to a corona discharge treatment, the multi-layer film was trimmed to obtain a stretched film having a thickness of 120 μm. Layer D of the resulting stretched film had a Bekk's surface smoothness of 350 seconds and an average surface roughness (Ra) of 0.7 μm.

The multi-layer film was processed to obtain a fan-shaped blank for a differential pressure-formed cup having a bottom diameter of 53 mm and a side wall height of 28 cm.

The blank was fixed to the inner wall of a female mold for pressure-vacuum forming, with the printed side thereof contacting the mold. A polypropylene sheet in a molten state (about 200° C.) was set 5 cm above the female mold by the use of a pressure-vacuum forming machine manufactured by Unic Co., Ltd., and the female mold was evacuated from the vacuum ports provided at the bottom thereof to thereby suck the blank onto the inner side of the mold while feeding compressed air of 4 kg/cm²G from air feed openings of a male plug to press the polypropylene sheet to the inner side of the female mold to conduct plug-assist forming for 10 seconds. After trimming, there was produced a blank-decorated polypropylene cup having an average wall thickness of 550 to 600 μm.

The blank on the resulting cup proved free from fading of the print thereof or deformation. The adhesion between the cup body and the blank was so strong that the blank could not be peeled off with a hand.

EXAMPLE 3

A compound comprising 92% of a propylene homopolymer having an MFR of 0.8 and a melting point of 164° to 167° C. and 8% of calcium carbonate, with the total amount of the propylene homopolymer and calcium carbonate being 100%, was melt-kneaded in an extruder set at 270° C., sheet-extruded, and cooled in a cooling device to obtain an unstretched sheet. The sheet was heated to 155° C. and longitudinally stretched 5 times.

An ethylene-propylene random copolymer containing 4.2% of ethylene and having an MFR of 4.2 and a melting point of 142° to 145° C. and an ethylene-methyl methacrylate copolymer having a melting point of 94° C. were separately melt-kneaded at 260° C. in the respective extruders, extruded from the respective dies, and successively laminated on the surface side and the back side of the above-prepared stretched sheet, respectively, to form a surface layer to be printed and a heat-sealable layer. The laminating was carried out with a chrome-plated mirror roll contacting with the surface layer to be printed, while giving an emboss of 80 lines at 0.3 mm intervals having a valley depth of 30 μm to the back layer (a heat-sealable layer) by passing through embossing rolls composed of a metallic roll and a rubber roll simultaneously with laminating.

The resulting multi-layer film was again heated to about 155° C. and transversely stretched 9 times. After the both sides of the stretched film were subjected to a corona discharge treatment at 60° C., the film was trimmed to obtain a three-layered stretched film composed of the surface layer, the base layer, and the back layer having a thickness of 20 μm, 60 μm, and 20 μm, respectively.

Offset printing was conducted on the surface layer of the three-layered stretched film, and the printed film was punched to obtain a 60 mm wide and 110 mm long label for blow molding. The label had a Clark hardness of 25 in MD (Machine Direction) and 50 in CD (Crossection Direction) as measured according to JIS P-8143.

The label in a label magazine was automatically inserted into the cavity of a high-speed blow molding machine manufactured by Placo Co., Ltd. by means of a suction pad of a robot fixed to the molding machine and fixed to the inner wall of one of the splits with the printed side of the label contacting the mold by suction. A tubular parison of high-density polyethylene (melting point: 134° C.) was extruded in a molten state at 190° C., and the splits were clamped. Compressed air of 4.2 kg/cm² was introduced inside the parison to expand the parison to shape of a container and, at the same time, fuse the label to the outer surface of the parison. The mold was cooled and opened, and a hollow container was taken out.

The label on the container showed no fading of the print, no shrinkage, or no blisters. Further, the automatic feed of the label was consecutively conducted 100 times without any fall off the mold or any misregister.

EXAMPLE 4

A compound comprising 79% of a propylene homopolymer having an MFR of 0.8 and a melting point of 164° C. ("Mitsubishi Noblen MA-6", produced by Mitsubishi Petrochemical Co., Ltd.), 5% of high-density polyethylene, and 16% of calcium carbonate having an average particle size of 1.5 μm, with the total amount of the propylene homopolymer, high-density polyethylene and calcium carbonate being 100%, was kneaded in an extruder set at 270° C. and sheet-extruded, followed by cooling in a cooling device to obtain an unstretched sheet. The sheet was heated to 156° C. and longitudinally stretched 5 times to obtain a uniaxially stretched film serving as a base layer (A).

Separately, a compound comprising 55% of a propylene homopolymer having an MFR of 4.0 and a melting point of 164° C. and 45% of calcium carbonate having an average particle size of 1.5 μm, with the total amount of the propylene homopolymer and calcium carbonate being 100%, was melt-kneaded in an extruder at 270° C. and extruded from a die to obtain a film serving as a surface layer (B) to be printed.

A compound comprising 50 parts of a styrene-grafted high-density polyethylene (styrene content: 43%) and 50 parts of an ethylene-acrylic acid copolymer was melt-kneaded at 270° C. in an extruder and extruded from a die to form a film serving as a heat-sealable layer (D).

Layer (B) and layer (D) were laminated by extrusion on the surface side and back side of layer (A), respectively. After cooling the multi-layer film to 55° C., layer (D) was embossed (120 lines). The multi-layer film was again heated to 158° C. and transversely stretched 9 times.

The stretched film was passed through an oven set at 165° C., by which base layer (A) and surface layer (B) were heat set and, at the same time, heat-sealable layer (D) was melted and made non-oriented. After cooling the heat-set film to 55° C., layer (B) was subjected to a corona discharge treatment, and the film was trimmed to obtain a multi-layer resin film comprising three layers of (B), (A), and (D) having a thickness of 40 μm, 80 μm, and 10 μm, respectively.

Layer (D) had a Bekk's surface smoothness of 250 seconds and an average surface roughness (Ra) of 2.0 μm.

Layer (B) of the multi-layer resin film was coated with an acryl type antistatic agent solution "ST-1300" (produced by Mitsubishi Petrochemical Co., Ltd.), followed by drying, and then printed in multi-color by offset printing. The printed multi-layer film was cut to a 50 mm wide and 50 mm long label for in-mold decorating.

The resulting label had a percent shrinkage of 1.6% in MD and 1.0% in TD when allowed to stand at 120° C. for 30 minutes.

Labeled hollow containers were produced as follows using the label obtained above.

Production of Labeled Hollow Container

Figure 6:
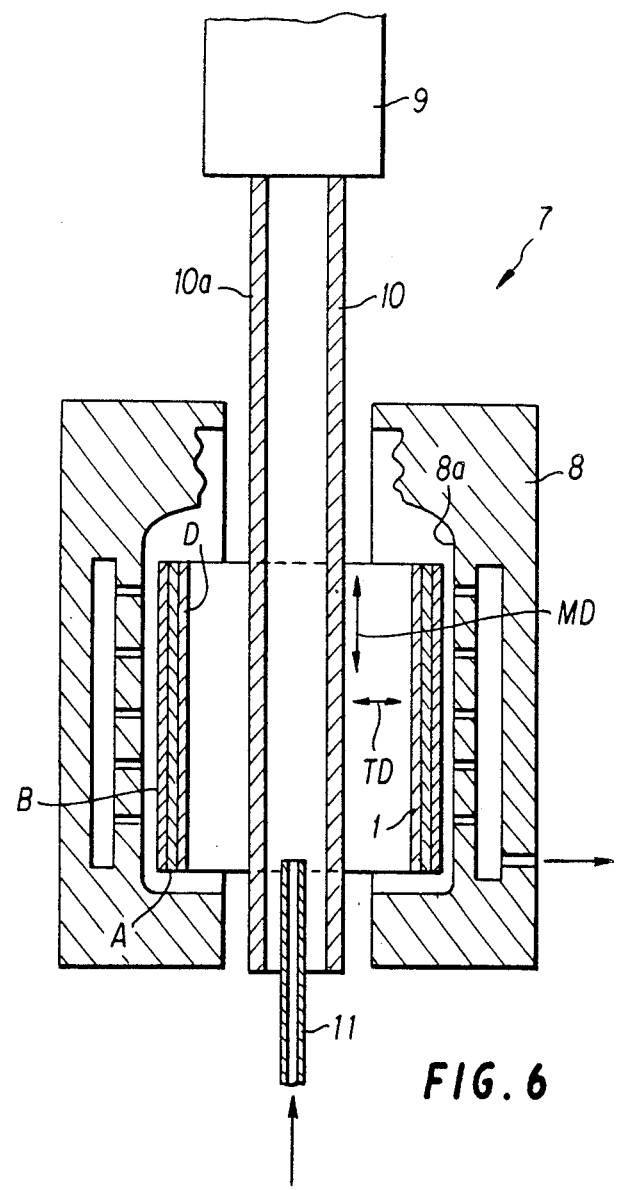
FIG. 6 is a crossectional view of a blow molding machine for producing a labeled hollow container using a label for in-mold decorating according to the present invention.

Reference is made to FIG. 6. Label 1 was inserted into the cavity of mold 8 of blow molding machine 7 and fixed to inner wall 8a of mold 8 heated at 41° C. by suction from inner wall 8a in such a manner that layer (B) of label 1 contacted inner wall 8a and that the direction of transverse stretching (TD) of the label might be consistent with the direction of extrusion (MD) of parison 10. High-density polyethylene having an MFR of 0.22 "Mitsubishi Polyethy-HD BZ-50A" (produced by Mitsubishi Petrochemical Co., Ltd.) was extruded at 180° C. from die 9 to form parison 10 having an inner diameter of 18 mm and a wall thickness of 3.3 mm. Mold 8 was locked to seal parison 10, and compressed air having a pressure of 5 kg/cm² was fed from nozzle 11 to the inside of parison 10 to conduct blow molding. Simultaneously with the blow molding, heat-sealable layer (D) of label 1 was pressed by outer side (10a) of parison 10 and fused thereto. Mold 8 was cooled to solidify the molded container and opened to obtain a labeled hollow container having a body diameter (girth) of 60 mm, a height of 200 mm and a wall thickness of 1 mm.

Twenty out of the resulting labeled containers were inspected with respect to deformation of the container, blisters of the label, and the surface condition of the label according to the following test methods. The results of the inspection are shown in Table 1 below.

Blisters

The labels free from blisters were marked at five, those suffering from blisters on an area less than 10% were marked at four, those suffering from blisters on an area of 10% or more and less than 20% were marked at three, those suffering from blisters on an area of 20% or more and less than 50% were marked at two, and those suffering from blisters on an area of 50% or more were marked at one. The marks of 20 containers per label were added together.

Deformation of Container

Two days after blow molding, the girth of the container at the part where the label was adhered and that at the part where no label was adhered were accurately measured with a slide gauge, and the difference between the two values was obtained. The measurements were made on 5 containers per label. A group of 5 containers per label any of which had a difference of girth within 1 mm was graded "good", a group of 5 containers per label including at least one container whose difference of girth was from 1 to 2 mm was graded "medium", and a group of 5 containers per label including at least one container whose difference of girth exceeded 2 mm was graded "poor".

Condition of Label

The surface of the label adhered on the container was visually observed.

TABLE 1

| | |
|---|---|
| Stretching Direction of Label With Respect to Extrusion Direction of Parison | TD (transverse stretching direction) |
| Blisters | 100 |
| Deformation of Container | good |
| Condition of Label | good |

EXAMPLE 5

Preparation of Styrene-Modified Ethylene Resin

In a 3 l-volume autoclave were charged 1400 g of pure water and 14 g of polyvinyl alcohol as a suspending agent to prepare an aqueous medium. In the aqueous medium was suspended 700 g of low-density polyethylene particles having a particle size of from 2 to 3 mm ("Yukaron LM-40" produced by Mitsubishi Petrochemical Co., Ltd.; density: 0.910) with agitation.

Separately, 0.50 g of t-butylperoxybenzoate as a polymerization initiator was dissolved in 735 g (corresponding to 105 parts per 100 parts of polyethylene) of styrene, and the solution was poured into the above-prepared suspension.

The inner temperature of the autoclave was raised to 90° C. and maintained at that point for 4 hours to thereby impregnate the styrene containing the polymerization initiator into the low-density polyethylene particles.

The aqueous suspension was heated to 105° C. and maintained at that temperature for 2 hours to conduct polymerization. The temperature was further elevated to 120° C. and maintained for 5 hours to complete the polymerization.

After cooling, the reaction mixture was taken out and washed with water to obtain 1000 g of styrene-modified low-density polyethylene particles having a particle size of from 3 to 4 mm.

Preparation of Synthetic Paper (1) A compound (A) comprising 81 parts of polypropylene "Mitsubishi Noblen MA-6" (produced by Mitsubishi Petrochemical Co., Ltd.; melting point: 164° C.), 3 parts of high-density polyethylene "Yukaron Hard EY-40" (produced by Mitsubishi Petrochemical Co., Ltd.; melting point: 130° C.; density: 0.950 g/cm$^3$), and 16 parts of calcium carbonate having a particle size of 1.5 μm was melt-kneaded in an extruder and sheet-extruded from a die at 250° C. The sheet was cooled to about 50° C.

The sheet was heated to about 153° C. and then longitudinally stretched 4 times by utilizing a difference of peripheral speeds of rolls to obtain a uniaxially stretched film (A). (2) A compound ($B_2$) comprising 52 parts of polypropylene "Mitsubishi Noblen MA-3" (produced by Mitsubishi Petrochemical Co., Ltd.; melting point: 163° C.), 3 parts of high-density polyethylene "EY-40" (density: 0.960 g/cm$^3$), and 45 parts of calcium carbonate and a compound ($B_1$) comprising 47 parts of polypropylene "MA-3", 5 parts of maleic anhydride-grafted polypropylene (produced by Mitsubishi Petro-Chemical Co., Ltd.; maleic anhydride content: 0.5%), 3 parts of high-density polyethylene "EY-40", and 45 parts of ground calcium carbonate were separately melt-kneaded in the respective extruders, fed to the same die, laminated together in the die, and extruded and laminated on one side of stretched film (A) obtained in (1) above with layer ($B_1$) as an external layer.

A compound (C) comprising 52 parts of polypropylene "MA-3", 3 parts of high-density polyethylene "EY-40", and 45 parts of ground calcium carbonate and a compound (D) comprising 50 parts of the styrene-modified low-density polyethylene as prepared above (styrene content: 105 parts per 100 parts of polyethylene) and 50 parts of an ethylene-methyl acrylate copolymer having a density of 0.94 g/cm$^3$ were separately melt-kneaded in the respective extruders, fed to the same die, laminated together in the die, and extruded and laminated at 250° C. on the other side of stretched film (A) with layer (D) as an external layer simultaneously with embossing layer (D) (100 lines). After the multi-layer sheet was once cooled to 60° C., the sheet was again heated to about 163° C. and transversely stretched 9 times by the use of a tentering frame. Then, the sheet was passed through an oven set at 165° C. for heat setting, followed by cooling to about 60° C. Layer ($B_1$) was subjected to a corona discharge treatment, and the sheet was trimmed to obtain a multi-layer stretched film comprising five layers ($B_1$), ($B_2$), (A), (C), and (D) in this order having a thickness of 5 μm, 15 μm, 70 μm, 18 μm, and 2 μm, respectively (total thickness: 110 μm).

Layer (D) had a Bekk's surface smoothness of 20 seconds and an average surface roughness (Ra) of 3.5 μm. The resulting multi-layer film had a percent shrinkage of 0.8% in TD and 1.0% in MD when allowed to stand at 120° C. for 30 seconds.

Blow Molding

A label 50 mm in width and 50 mm in length was fixed by suction to the inner wall of a mold for blow molding set at 41° C. with paper-like layer ($B_1$) contacting the mold. High-density polyethylene "EY-40" was extruded at 180° C. into the cavity to form a tubular parison. The parison was sealed by locking the mold, and compressed air having a pressure of 5 kg/cm$^2$ was fed into the parison to form the parison to shape. The mold was cooled to solidify the molded article and opened to take out a hollow container having a body diameter of 60 mm, a height of 200 mm, and a wall thickness of 1 mm.

Twenty labeled containers thus obtained were inspected. As a result, any label on the containers proved free from blisters (trapped air-pockets), and none of the 20 containers was found to suffer from deformation.

EXAMPLE 6

Labeled hollow containers were produced in the same manner as in Example 5, except for using an ethylene-methyl methacrylate copolymer having a melting point of 84° C. for heatsealable layer (D). The resulting labeled containers were inspected in the same manner as in Example 5 and proved free from blisters of label and deformation.

While the invention has been described in detail and with reference to specific embodiments thereof, it will be apparent to one skilled in the art that various changes and modifications can be made therein without departing from the spirit and scope thereof.

What is claimed is:

1. A process for producing synthetic label paper which comprises preparing a multi-layer film comprising a film of a thermoplastic resin containing an inorganic fine powder having provided on the back side thereof a layer of a heat-sealable resin having a melting point lower than that of said thermoplastic resin, embossing the heat-sealable resin layer, and stretching the embossed multi-layer film at a temperature of from the melting point of said heat-sealable resin to a temperature lower than the melting point of said thermoplastic resin.

2. A process as claimed in claim 1, wherein said heat-sealable resin is an ethylene-alkyl acrylate copolymer or an ethylene-alkyl methacrylate copolymer each having a melting point of from 80° to 130° C.

3. A process as claimed in claim 1, wherein said heat-sealable resin is a composition comprising (a) from 10 to 70% by weight of a styrene-modified ethylene resin obtained by polymerizing from 50 to 400 parts by weight of styrene in the presence of 100 parts by weight of an ethylene resin and (b) from 30 to 90% by weight of an ethylene-alkyl acrylate copolymer or an ethylene-alkyl methacrylate copolymer each having a melting point of from 80° to 130° C., with the total amount of the resin as defined in (a) and the copolymer as defined in (b) being 100% by weight, and said inorganic fine powder-containing thermoplastic resin is polypropylene.

4. A process as claimed in claim 2, wherein said synthetic label paper is a multi-layer resin film having a total thickness of from 30 to 300 μm and comprising at least:

(A) a biaxially stretched film base layer comprising a resin composition containing from 5 to 30% by weight of an inorganic fine powder, from 0 to 25% by weight of an ethylene resin and from 70 to 95% by weight of a propylene resin, with the total amount of the inorganic fine powder, the ethylene resin and the propylene resin being 100% by weight, (B) a uniaxially stretched paper-like film layer comprising a resin composition containing from 35 to 65% by weight of an inorganic fine powder and from 35 to 65% by weight of a propylene resin, with the total amount of the inorganic fine powder and the propylene resin being 100% by weight, being provided on one side of said biaxially stretched film base layer, (C) a uniaxially stretched paper-like film layer comprising a resin composition containing from 35 to 65% by weight of an inorganic fine powder and from 35 to 65% by weight of a propylene resin, with the total amount of the inorganic fine powder and the propylene resin being 100% by weight, being provided on the opposite side of said biaxially stretched film base layer, and (D) a uniaxially stretched heat-sealable layer comprising an ethylene-alkyl acrylate copolymer or an ethylene-alkyl methacrylate copolymer, being provided on the surface of said paper-like layer (C), said heat-sealable layer having a thickness of from 1 to 10 $\mu$m and a Bekk's surface smoothness of 1000 seconds as measured according to JIS P-8119.

5. A process as claimed in claim 3, wherein said synthetic label paper is a multi-layer resin film having a total thickness of from 30 to 300 $\mu$m and comprising at least:

(A) a biaxially stretched film base layer comprising a resin composition containing from 5 to 30% by weight of an inorganic fine powder, from 0 to 25% by weight of an ethylene resin and from 70 to 95% by weight of a propylene resin, with the total amount of the inorganic fine powder, the ethylene resin and the propylene resin being 100% by weight, (B) a uniaxially stretched paper-like film layer comprising a resin composition containing from 35 to 65% by weight of an inorganic fine powder and from 35 to 65% by weight of a propylene resin, with the total amount of the inorganic fine powder and the propylene resin being 100% by weight, being provided on one side of said biaxially stretched film base layer, (C) a uniaxially stretched paper-like film layer comprising a resin composition containing from 35 to 65% by weight of an inorganic fine powder and from 35 to 65% by weight of a propylene resin, with the total amount of the inorganic fine powder and the propylene resin being 100% by weight, being provided on the opposite side of said biaxially stretched film base layer, and (D) a uniaxially stretched heat-sealable layer comprising a resin composition comprising (a) from 10 to 70% by weight of a styrene-modified ethylene resin obtained by polymerizing from 5 to 400 parts by weight of styrene in the presence of 100 parts by weight of an ethylene resin and (b) from 30 to 90% by weight of an ethylene-alkyl acrylate copolymer or an ethylene-alkyl methacrylate copolymer each having a melting point of from 80° to 130° C., with the total amount of the resin as defined in (a) and the copolymer as defined in (b) being 100% by weight, being provided on the surface of said paper-like layer (C), said heat-sealable layer having a thickness of from 1 to 10 $\mu$m and a Bekk's surface smoothness of 1000 seconds as measured according to JIS P-8119.

* * * * *